US012657668B2

(12) United States Patent 　　　　　(10) Patent No.: 　US 12,657,668 B2
Shenoy et al. 　　　　　　　　　　　　(45) Date of Patent: 　　Jun. 16, 2026

(54) METHODS FOR SAMPLING SYNTHETIC DEFECT IMAGE GENERATION

(71) Applicant: Samsung Display Co., Ltd., Yongin-si (KR)

(72) Inventors: Rahul Shenoy, San Jose, CA (US); Kaushik Balakrishnan, San Jose, CA (US); Qisen Cheng, San Jose, CA (US); Janghwan Lee, San Jose, CA (US); Yongmoon Jeon, Gyeonggi-do (KR); Deokyeong Jeong, Gyeonggi-do (KR); Euiyoung Jeong, Gyeonggi-do (KR); Jaewon Kim, Gyeonggi-do (KR)

(73) Assignee: Samsung Display Co., Ltd., Yongin-si (KR)

( * ) Notice: Subject to any disclaimer, the term of this patent is extended or adjusted under 35 U.S.C. 154(b) by 253 days.

(21) Appl. No.: 18/637,325

(22) Filed: Apr. 16, 2024

(65) Prior Publication Data

US 2025/0173833 A1 　　May 29, 2025

Related U.S. Application Data

(60) Provisional application No. 63/603,045, filed on Nov. 27, 2023.

(51) Int. Cl.
　*G06T 5/60* 　　　(2024.01)
　*G06T 5/70* 　　　(2024.01)
　*G06V 10/774* 　　(2022.01)
　*G06V 10/82* 　　 (2022.01)

(52) U.S. Cl.
　CPC ................. *G06T 5/60* (2024.01); *G06T 5/70* (2024.01); *G06V 10/774* (2022.01); *G06V 10/82* (2022.01); *G06T 2207/20081* (2013.01); *G06T 2207/20084* (2013.01); *G06T 2207/30108* (2013.01)

(58) Field of Classification Search
　CPC ... G06T 5/60; G06T 5/70; G06T 2207/20081; G06T 2207/20084; G06T 2207/30108; G06V 10/82; G06V 10/774
　See application file for complete search history.

(56) References Cited

U.S. PATENT DOCUMENTS

| | | | |
|---|---|---|---|
| 10,650,508 B2 | 5/2020 | Chang et al. | |
| 2018/0293713 A1* | 10/2018 | Vogels | G06T 5/70 |
| 2021/0304364 A1* | 9/2021 | Kabaria | G06T 5/50 |
| 2022/0207707 A1* | 6/2022 | Yang | G06T 7/0004 |
| 2022/0343479 A1 | 10/2022 | Chang | |
| 2023/0024955 A1 | 1/2023 | Kumar et al. | |
| 2024/0112308 A1* | 4/2024 | Hofmann | G06T 15/503 |

* cited by examiner

*Primary Examiner* — Ming Shui

(74) *Attorney, Agent, or Firm* — Womble Bond Dickinson (US) LLP

(57) 　　　　　　ABSTRACT

A method may include applying, by a processor, noise to a first image to generate a first noisy image, removing, by the processor, at least a portion of the noise from the first noisy image based on a neural network, selecting, by the processor, during the removing of the noise, a denoising path on the neural network corresponding to a greatest difference between a first intermediate denoised image and a second intermediate denoised image, and generating, by the processor, a second image based on the selected denoising path.

20 Claims, 7 Drawing Sheets

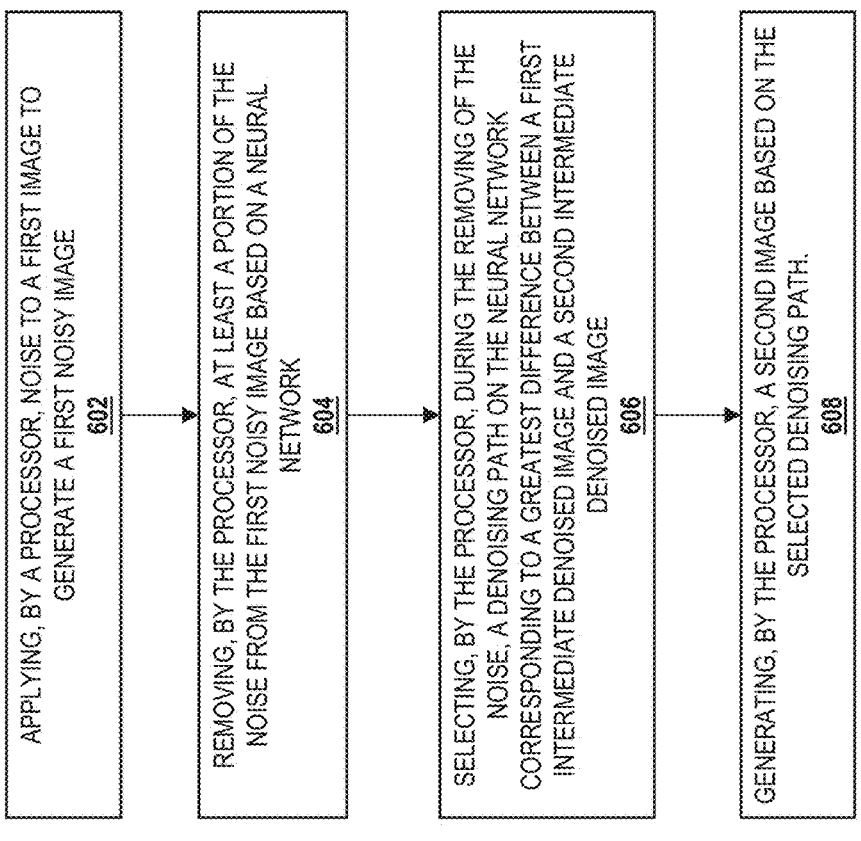

APPLYING, BY A PROCESSOR, NOISE TO A FIRST IMAGE TO GENERATE A FIRST NOISY IMAGE
602

REMOVING, BY THE PROCESSOR, AT LEAST A PORTION OF THE NOISE FROM THE FIRST NOISY IMAGE BASED ON A NEURAL NETWORK
604

SELECTING, BY THE PROCESSOR, DURING THE REMOVING OF THE NOISE, A DENOISING PATH ON THE NEURAL NETWORK CORRESPONDING TO A GREATEST DIFFERENCE BETWEEN A FIRST INTERMEDIATE DENOISED IMAGE AND A SECOND INTERMEDIATE DENOISED IMAGE
606

GENERATING, BY THE PROCESSOR, A SECOND IMAGE BASED ON THE SELECTED DENOISING PATH.
608

FIG. 6

METHODS FOR SAMPLING SYNTHETIC DEFECT IMAGE GENERATION

CROSS-REFERENCE TO RELATED APPLICATION

This application claims the priority benefit under 35 U.S.C. § 119(e) of U.S. Provisional Application No. 63/603,045, filed on Nov. 27, 2023, the disclosure of which is incorporated by reference in its entirety as if fully set forth herein.

FIELD

The present disclosure generally relates to defect classification using artificial intelligence. More particularly, the subject matter disclosed herein relates to improvements to methods for sampling synthetic defect image generation.

SUMMARY

Production of electronic devices, for example, television and mobile display devices have grown rapidly over the recent years. To keep up with the mass production of such devices, there have been efforts to improve manufacturing techniques and efficiencies, for example, by detecting, classifying, and repairing defects in the circuitry when they are produced at the manufacturing line. Improved techniques leveraging artificial intelligence (AI) and machine learning (ML) in such processes in alignment with emerging Industry 4.0/Smart Manufacturing paradigm are desired.

According to an embodiment of the present disclosure, a method may include applying, by a processor, noise to a first image to generate a first noisy image; removing, by the processor, at least a portion of the noise from the first noisy image based on a neural network; selecting, by the processor, during the removing of the noise, a denoising path on the neural network corresponding to a greatest difference between a first intermediate denoised image and a second intermediate denoised image; and generating, by the processor, a second image based on the selected denoising path.

The method including the selecting of the denoising path on the neural network corresponding to the greatest difference may include generating the first intermediate denoised image by setting a class label for the neural network corresponding to the first image; generating the second intermediate denoised image by setting the class label for the neural network corresponding to the second image; and determining the difference between the first intermediate denoised image and the second intermediate denoised image.

The neural network may be trained by a source product and the first image is from a target product.

The neural network may be a diffusion model neural network.

The diffusion model may include a fixed time step and the selecting of the denoising path may be performed at an interval corresponding to the fixed time step.

The time step may be in a range of 10 to 100.

The first image may be a defect free image of a target product.

The second image may be a synthetic defect image of the target product.

The noise may include Gaussian noise.

The removing of the noise from the first noisy image may further include selecting a denoising path on the neural network corresponding to the greatest difference between the first intermediate denoised image and the second intermediate denoised image, and between the second intermediate denoised image and a third intermediate denoised image.

According to another embodiment of the present disclosure, a system may include a processor; and a memory storing instructions executed by the processor to cause the processor to apply noise to a first image to generate a first noisy image; remove at least a portion of the noise from the first noisy image based on a neural network; select, during the removing of the noise, a denoising path on the neural network corresponding to a greatest difference between a first intermediate denoised image and a second intermediate denoised image; and generate a second image based on the selected denoising path.

However, the present disclosure is not limited to the above aspects and features. The above and additional aspects and features will be set forth, in part, in the description that follows, and in part, may be apparent from the description, or may be learned by practicing one or more of the presented embodiments of the present disclosure.

BRIEF DESCRIPTION OF THE DRAWINGS

In the following section, the aspects of the subject matter disclosed herein will be described with reference to exemplary embodiments illustrated in the figures, in which:

FIG. 6 is a flow chart of a method for synthetic defect image generation using diffusion models, according to one or more embodiments of the present disclosure.

DETAILED DESCRIPTION

Figure 1:
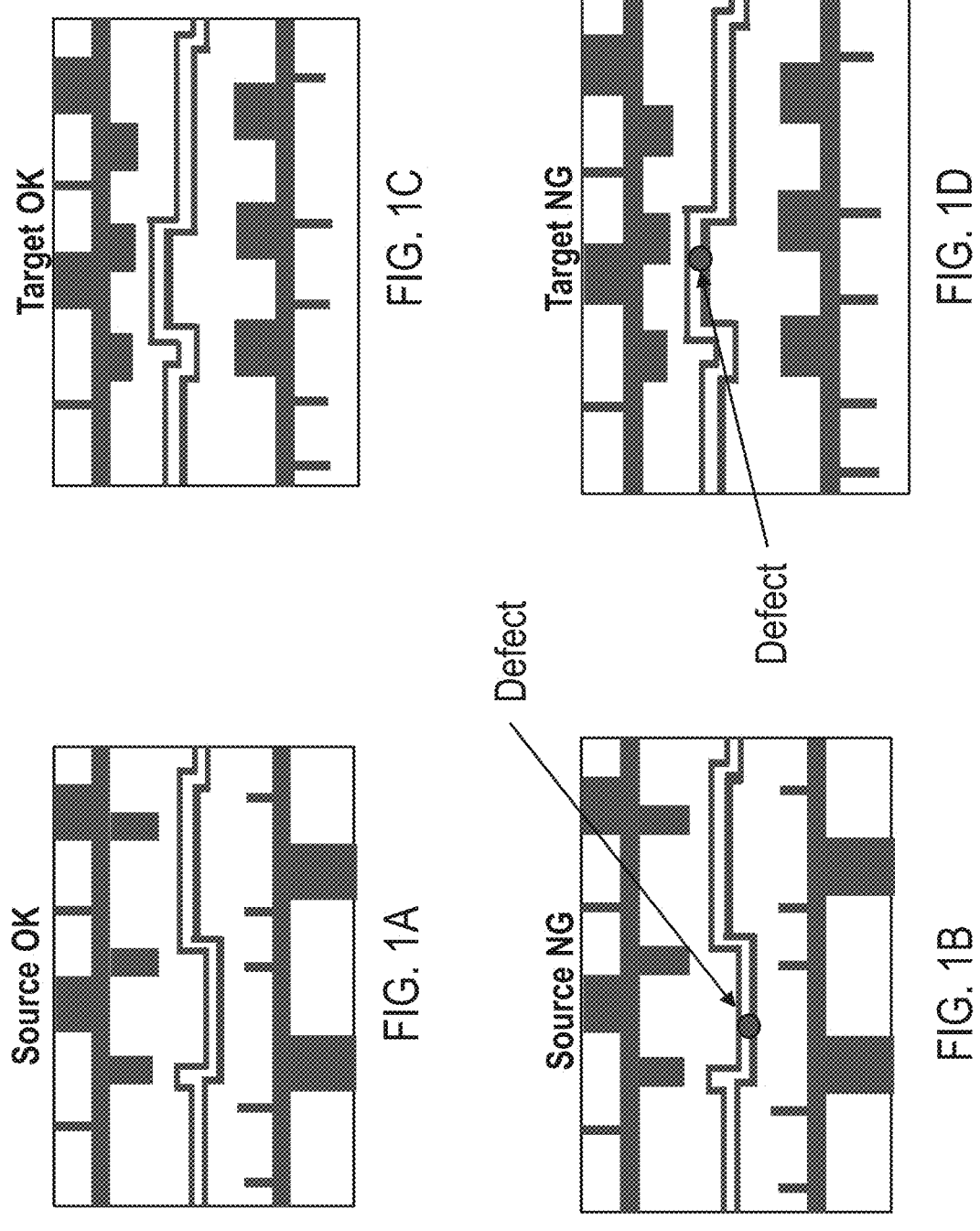
FIG. 1A is an example defect-free image of a source.
FIG. 1B is an example defect image of the source.
FIG. 1C is an example defect-free image of target.
FIG. 1D is an example defect image of the target.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Manufacturing of products in a factory or a production line may include various processes to ensure certain quality requirements are satisfied. For example, in a factory that produces electronic devices, such as organic light-emitting diode (OLED) devices and/or quantum dot (QD)-OLED devices, an inspection process may be implemented to look for defects in the circuitry, classify the defects, and repair the defects. Furthermore, defects in the OLED/QD-OLED manufacturing process may be identified for efficiency and robustness. In some defect identification systems and methods, classification and repair may be undertaken by human personnel who remotely operate the whole system, which may be relatively costly, time consuming and may be prone to human error. To make the manufacturing process relatively more robust, an AI-based defect classification and repair system may be utilized. However, to build an AI-based classifier, data balance between the number of defect-free and defective sample images used to train the AI model, may not be practical since the number of defective samples in manufacturing are typically a very small subset of the total (e.g., 1-2%). This data imbalance may hinder the development of a robust defect detection classifier. To mitigate this problem, an AI-based generative model may be used to learn the data distribution of defect-free (OK) and defect (NG) samples from source products and transfer them to OK images from target products, to create synthetic NG images for the target products. Many of the NG images may have defects of different shapes and sizes and can occur at different locations of the image, all of which may be learned by the generative model so that good quality fake NG images can be generated by the model, which can thereafter be used to train classifiers that will be deployed in the factory line.

Diffusion models may be utilized as generative models to generate synthetic images. However, vanilla diffusion models may be designed for images in the nature (e.g., cat, dog, mountains, etc.), which are different from OLED/QD-OLED factory images, and custom algorithms may be developed to generate high-quality fake NG images. Aspects of some embodiments may utilize a sampling method called "difference maximization" and this sampling method may be utilized to sample fake NG images from a trained Diffusion model.

A method according to some embodiments may maximize or improve the difference between OK and NG images during the denoising phase of sampling from the diffusion model, and this procedure may produce relatively high-quality fake NG images. Some embodiments may demonstrate high quality fake NG images generated by the diffusion model by comparing them with real NG images and use classifiers trained on them for comparison. Specifically, the diffusion model may be used to generate fake NG images and these are used for data augmentation to train the classifiers. In particular, some embodiments may demonstrate defect transfer from source to target products, where the target products have much fewer defects in the original dataset. With the use of a sampling method according to some embodiments, the quality and diversity of images generated by the diffusion model may be relatively high, which may make it practical from a deployment standpoint.

Some generative AI models such as Generative Adversarial Networks (GANs) may suffer from mode collapse where the classifier learns to generate images of only some defects. That is, the generated defects may lack diversity. In other techniques, diffusion models may be used because they may be more powerful. However, diffusion models may also have trade-off issues with quality, fidelity, and diversity. For example, conventional GAN or diffusions models may generate synthetic defect images that appear very similar to the defect-free images and therefore, the classifier may confuse a defect-free image with a defect image because they may appear so similar. Thus, improved techniques that can overcome such issues with quality, fidelity, and diversity is desired to build a more robust classifier model that can automatically repair defects in a new line of products such as OLED and QD OLED display devices.

FIG. 1A is an example defect-free image of a source, FIG. 1B is an example defect image of the source, FIG. 1C is an example defect-free image of target, and FIG. 1D is an example defect image of the target. Here in the present disclosure, a defect-free image may be referred to as an "OK" image and a defect image may be referred to as an "NG" image. Accordingly, FIG. 1A simply shows a close-up view of a portion of an example circuitry of a source product or device that is defect free. Similarly, FIG. 1C simply shows a close-up view of a portion of an example circuitry of a target product or device that is defect free. Thus, although the target does not have an identical circuit as the source, there are some similarities between the source and the target. Therefore, generative-AI may be used to take a defect image from the source and generate a synthetic defect image on the target. This process may be used to generate a sufficient amount of defect images so that an AI-classifier for the target product may be trained so that it can classify images and automatically repair any defects. Accordingly, a neural network of the diffusion model may be trained from the source device such that the trained neural network can be used to take OK images of the target device and generate synthetic defect (NG) images of the target device. In other words, the defect image of the source product such as that shown in FIG. 1B may be used to train the neural network such that this neural network may be used on the target product to generate a synthetic defect image of the target product such as that shown in FIG. 1D. Therefore, even though the image of the target product did not have a defect (as shown in FIG. 1C), a "fake" defect may be generated on the image of the target product as shown in FIG. 1D.

Figure 2:
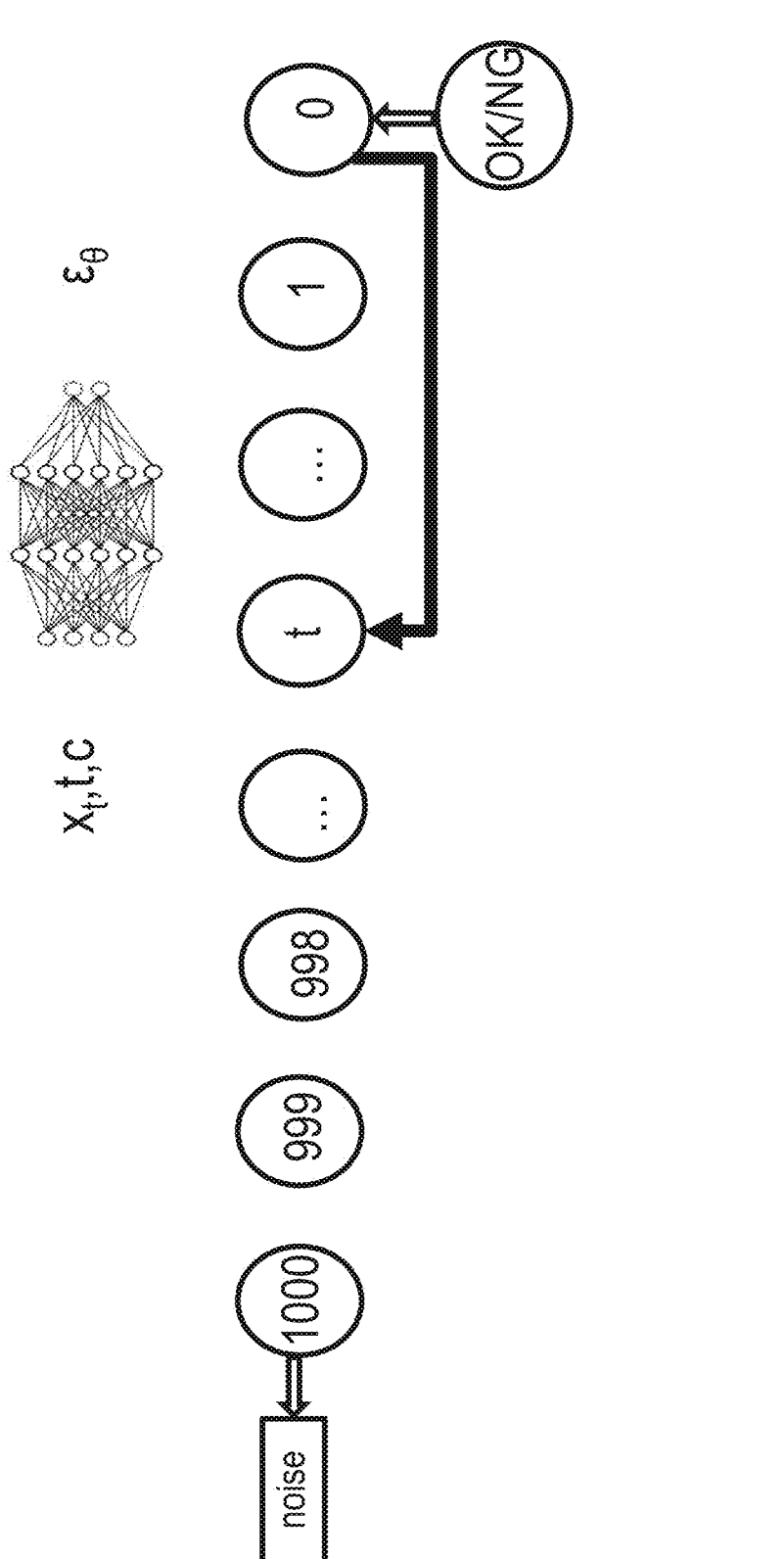
FIG. 2 is a diagram illustrating a process for training a class conditioned diffusion model on a source product.

FIG. 2 is a diagram illustrating a process for training a class conditioned diffusion model on a source product. Accordingly, the process may be illustrated as a sequence of a set number of images (e.g., T number of images, where T=1000) ranging from an image that has no noise at step 0 to an image at step 1000 that is pure noise. The images between step 0 and step 1000 have a gradually increasing amount of noise (e.g., Gaussian noise) such that the image at step 1 has a little bit of noise added to the image at step 0, the image at step 2 has a little bit more noise in addition to the image at step 1, and so on until the step at 1000, which is pure noise. By way of example, the following training algorithm may be utilized to execute the training process:

repeat $(x_0, c) \sim q(x_0, c)$ $t \sim \text{Uniform}(\{1, \dots, T\}); \epsilon \sim N(0, I)$ take gradient descent step on $\nabla_\theta (L_{simple} + \lambda L_{vlb})$ $L_{simple} = \mathbb{E}_{t, x_0, \epsilon} \left[ \left\| \epsilon - \epsilon_\theta (\sqrt{\overline{\alpha}_t} x_0 + \sqrt{1 - \overline{\alpha}_t} \epsilon, t, c) \right\|^2 \right]$ $L_{vlb} = L_0 + L_1 + \dots + L_{T-1} + L_T$ $L_0 = -\log(p_\theta(x_0 | x_1, c))$ $L_{t-1} = D_{KL}(q(x_{t-1} | x_t, x_0, c) \| p_\theta(x_T, c))$ $L_T = D_{KL}(q(x_T | x_0, c) \| p_\theta(x_T, c))$ until converged Accordingly, the neural network may be trained such that the amount of noise that is added at each step is known. Thus, the neural network may predict the amount of noise that is present in the image at any step t, and therefore, the noise may be removed to reveal or generate a purely noiseless image.

Figure 3:
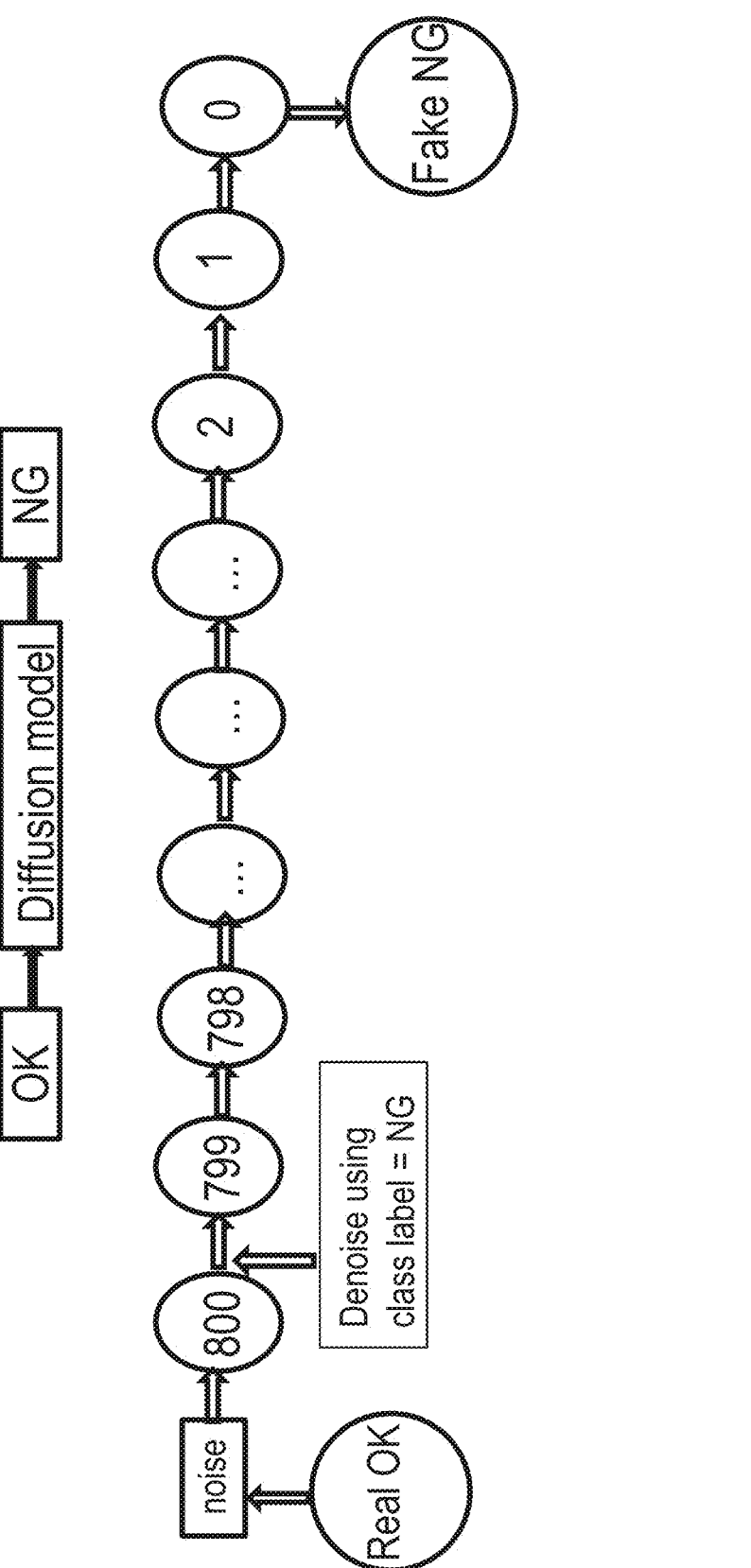
FIG. 3 is a diagram illustrating a process for sampling (or generating) synthetic defect (NG) images from a diffusion model, according to one or more embodiments of the present disclosure.

FIG. 3 is a diagram illustrating a process for sampling (or generating) synthetic defect (NG) images from a diffusion model, according to one or more embodiments of the present disclosure. Thus, the diffusion model may be used to take an OK image from a target device and generate a synthetic NG image from the OK image based on the neural network that was built and trained from the source device.

In one or more embodiments of the present disclosure, the trained neural network includes an input with variables Xt, t, and c, wherein Xt corresponds to a partially noisy image, t corresponds to the time step, and c corresponds to a class label that may indicate to the neural network whether to generate an OK image or an NG image. Thus, by setting the class label c to OK, an OK image may be generated by the neural network. Similarly, by setting the class label to NG, an NG image may be generated by the neural network. For example, during training, class label embeddings may be learned. Therefore, if c=OK, a first embedding vector may be used as an input. On the other hand, if c=NG, then an embedding vector (i.e., a different embedding vector) may be used as input, of which both the first embedding vector and the second embedding vectors may be trained. Consequently, the neural network will know whether an OK image is to be generated or an NG image is to be generated depending on the embedding vector that is used as the input (i.e., the "c" input to the neural network). Accordingly, a neural network may be trained so that a noiseless or nearly noiseless OK image or NG image may be generated depending on the class label.

In some embodiments, this above-described trained neural network may be utilized on other devices (e.g., a target device) to generate OK or NG images. However, as discussed above, the target device already has many OK images so more OK images are not necessarily needed. On the other hand, more NG images are desired because a target device may have a shortage of defect images. Therefore, by setting the class label c to NG, a defect image for the target device may be generated by the neural network trained on the source device.

According to one or more embodiments of the present disclosure, the sampling process may start with an OK image of the target device, and noise (e.g., Gaussian noise) may be added to the OK image to generate a noisy OK image, which may be expressed by the equation:

$$x_{T'} = \mathcal{N}\left(\sqrt{\overline{\alpha}_{T'}}\, x_0, (1 - \overline{\alpha}_{T'})I\right)$$

Where, $x_{T'}$ is the noisy OK image with T'=800,
$x_0$ is an OK image and $\overline{\alpha}_T$ is a mathematical function of the noise schedule.

Once noise has been added to the image, the class label c may be set to NG, and the noise may be removed by using the diffusion model in order generate an NG image. It should be noted that while there are 1000 steps as shown in FIG. 2 with reference to training, the sampling process shown in FIG. 3 starts at step 800 because the images at approximately steps 800-1000 are mostly noise with the background substantially destroyed. Therefore, the sampling process may skip those portions and start denoising from an intermediate step at around step 800, thus bypassing the images with substantial noise and instead utilize the images that have some noise and some background information. Furthermore, it should be noted that step 800 is shown here by way of example and that other intermediate steps may instead be used as the starting point for the sampling process.

In some embodiments, because the class label is now set to NG, the denoised image may now generate an NG image, which may be referred to here as a synthetic NG image or a fake NG image. However, it should be noted that the defects in the images are very small and therefore the difference in the images between an OK image and an NG image is very small. Accordingly, a process for maximizing the difference between the OK image and the NG image may be performed to enhance the generation of the synthetic NG images, according to one or more embodiments of the present disclosure.

Figure 4:
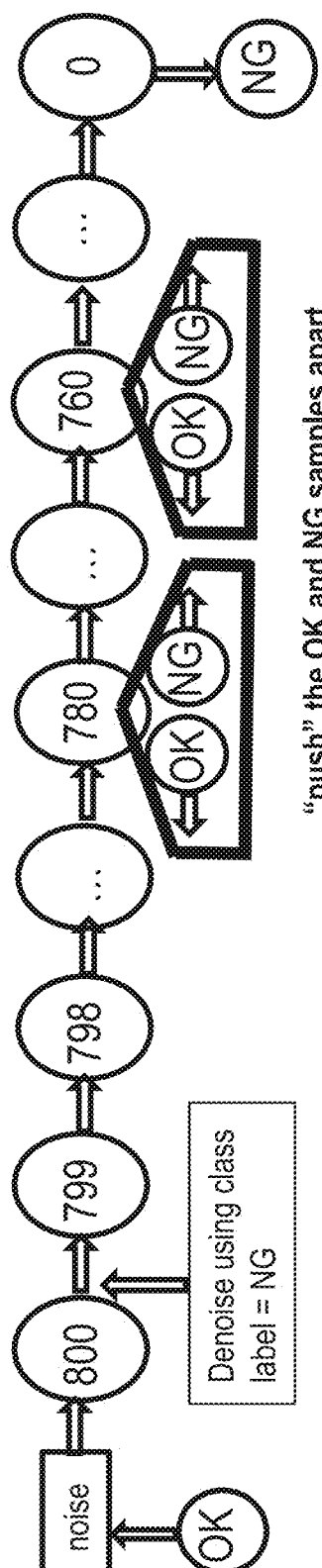
FIG. 4 illustrates a sampling process for performing difference maximization to generate a synthetic NG image from an OK image, according to one or more embodiments of the present disclosure.

FIG. 4 illustrates a sampling process for performing difference maximization during the denoising process to generate a synthetic NG image that looks different (e.g., substantially different) from an OK image, according to one or more embodiments of the present disclosure. Thus, to generate an improved synthetic defect image that is more distinguishable from the OK image, difference maximization may be performed during the denoising process and/or in addition to the denoising process. According to one or more embodiments of the present disclosure, the difference maximization may be performed at some specified or predetermined frequency during the denoising process. Thus, for example, the denoising process in FIG. 5 may start at step 800, where at each step (e.g., 779, 778, 777, etc.), noise is gradually removed from the noisy image. However, at a certain specified or predetermined number of steps $\eta$, for example, every 20 steps where $\eta$=20, difference maximization may be performed. Therefore, in the above-described example, at step 780, the OK image and the NG image may be pushed apart, then denoising may be performed until step 760, where the OK image and the NG image may be pushed apart again, and so on, every 20 steps. It should be noted that the denoising process may be performed at every step, including the step at which the difference maximization is performed. Accordingly, the process of denoising at every step, and then performing difference maximization may be performed until a fake NG image is generated as shown as "NG" in FIG. 4. The terms "push" or "pushing" apart the OK and NG images will be described in more detail with reference to FIG. 5. By way of example, the following sampling algorithm may be utilized to execute the sampling process including the difference maximization:

w: guidance strength, $\eta$: sampling steps, $\tau$: skip time steps $x_T = \mathcal{N}\,(\sqrt{\overline{\alpha}_{T'}}\, x_0, (1 - \overline{a}_T)I)$ // $x_0$ is an OK image
for t = T', ... , 1 do
$\quad \epsilon_\theta'(x_t, t) = (1 + w)\, \epsilon_\theta(x_t, t, c_{NG}) - w\, \epsilon_\theta(x_t, t, c_{OK})$
$\quad$ if((T' − t) % $\tau$ = 0) and (t > 1):
$\quad\quad$ for k = 1, ... , $\eta$ do:
$\quad\quad\quad z_k \sim \mathcal{N}(0, I)$ $$x_{t-1} = \frac{1}{\sqrt{\alpha_t}}\left(x_t - \frac{1 - \alpha_t}{\sqrt{1 - \overline{\alpha}_t}}\epsilon_\theta'(x_t, t)\right) + \sigma_\theta(x_t, t)z_k$$

$$d_k = \|\epsilon_\theta(x_{t-1}, t - 1, c_{NG}) - \epsilon_\theta(x_{t-1}, t - 1, c_{OK})\|$$
$\quad\quad$ end for
$\quad\quad k^* = \arg\max d_k;\ z = z_{k^*}$
$\quad$ else:
$\quad\quad z \sim \mathcal{N}(0, I)$ if t > 1, else z = 0

$$x_{t-1} = \frac{1}{\sqrt{\alpha_t}}\left(x_t - \frac{1 - \alpha_t}{\sqrt{1 - \overline{\alpha}_t}}\epsilon_\theta'(x_t, t)\right) + \sigma_\theta(x_t, t)z_k$$

end for
return $x_0$ // synthetic NG image

Figure 5:
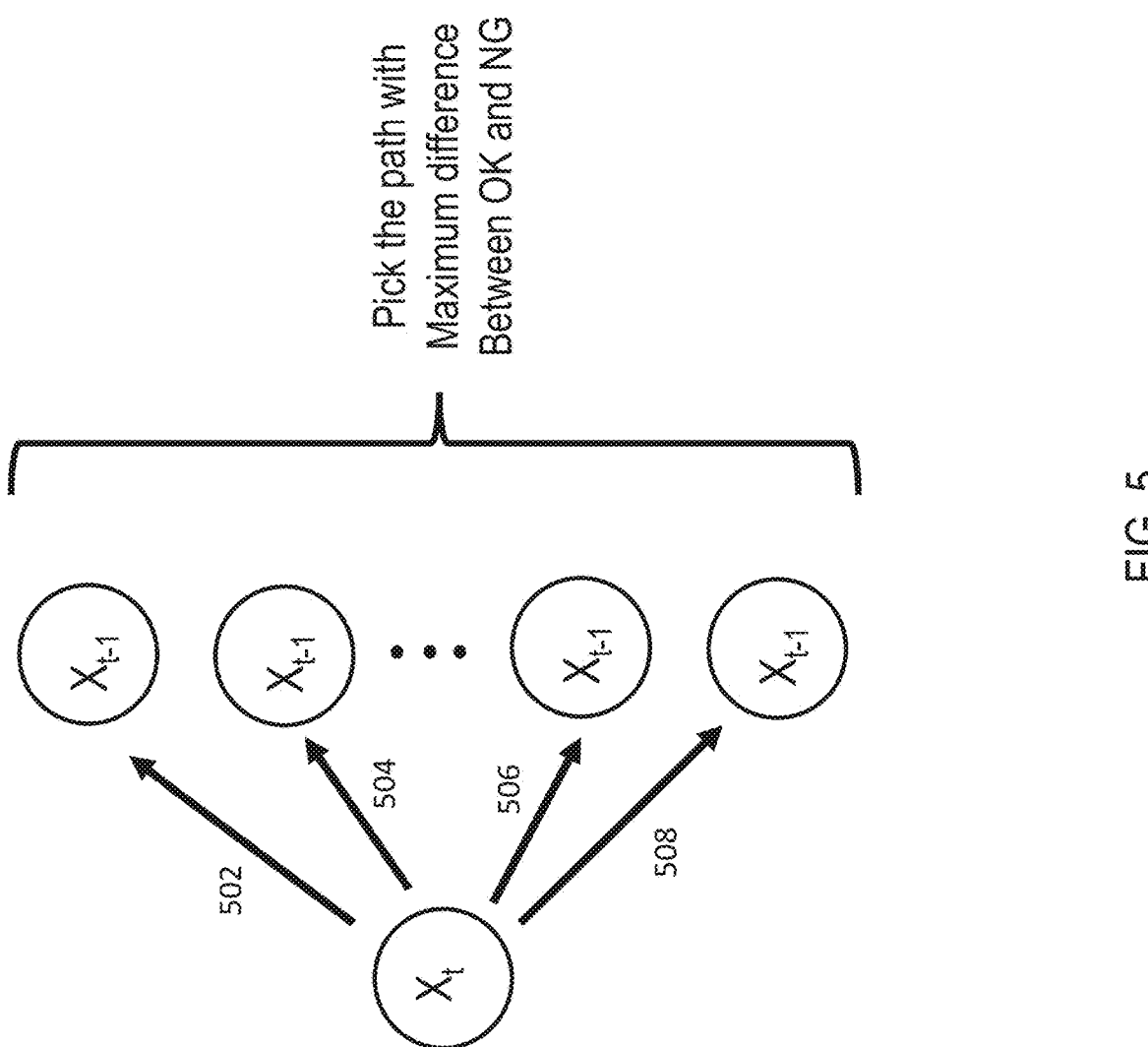
FIG. 5 illustrates the multiple paths that the denoising path may take, according to one or more embodiments of the present disclosure.

FIG. 5 illustrates a process for performing difference maximization, according to one or more embodiments of the present disclosure. Accordingly, Xt may correspond to one of the steps where the difference maximization may occur, for example, at step 780 in FIG. 4. In order to get to the next step X(t−1) (e.g., step 779), the partially noisy image Xt at time t may take different paths to get to X(t−1), wherein each path may generate varying degrees of differences between the OK image and the NG image. More specifically, an OK image and an NG image may be generated from step Xt to X(t−1) via a first path 502, and a difference in the images between the OK image and the NG image (e.g., the difference in the pixel space between the OK image and the NG image) generated via the first path 502 is computed. Similarly, a difference between an OK image and NG image may be generated from step Xt to X(t−1) via a second path 504, a difference in the images between the OK image and the NG image generated via the second path 504 is computed. The same process may be repeated for other available paths (e.g., third path 506, fourth path 508), and the path that resulted in the greatest difference in the pixel space of the OK image and the NG image may be selected as the path to take. This process may be referred to herein the present disclosure as the difference maximization process or "pushing" apart the OK and NG images, and may be expressed by the equation: $d = \max\|\epsilon_\theta(x_{t-1}, c=ng) - \epsilon_\theta(x_{t-1}, c=ok)\|$. By following this process, the synthetic NG image that is generated by the neural network has the greatest difference from the OK image. Accordingly, the denoising process may be a guided diffusion in that the output is pushed toward a path that generates the maximum difference.

In one or more embodiments, the number of steps η at which the OK and NG images are pushed apart may be varied. Thus, for example, although the example embodiments described in the present disclosures uses η=20 steps as the increment in which the OK and NG images are pushed apart, other number of steps n may be used, for example η=10 steps or η=30 steps or η=100 steps. Furthermore, although the total number of steps in the diffusion model of the present disclosures includes 1000 steps, the diffusion model may instead include any other number of steps as well, for example 800 steps or 900 step, etc. Accordingly, by varying the n and the total number of steps, the diversity of the defect in the image may be enhanced. In other words, the synthetic defects may be generated at different locations, and have different shapes and sizes. Furthermore, the quality of the defects may be improved such that the even though the defects are generated (i.e., synthetic or fake), the defects look realistic and consistent with the defects from the training dataset from the source.

In some embodiments, the guiding of the diffusion model may be extended to more than two classes (i.e., more than just one OK class and one NG class). For example, there may be one OK class and a plurality of NG classes or subclasses, e.g., NG1, NG2, NG3. Therefore, the neural network of the diffusion model may be configured to generate a defect of any one or more of the defect classes NG1, NG2, or NG3. Thus, for example, if it is desired to generate a defect of class NG1, then the diffusion model may determine the maximum difference between each of the classes. That is, the maximum difference between OK and NG1, between NG1 and NG2, and NG1 and NG3, and then selecting the one with the greatest difference as the path to choose. Accordingly, the NG1 image may be most distinguishable from OK, NG2, and NG3 images. The equation may be written as:

$$d1 = \| \epsilon_\theta(x_{t-1}, c = ng1) - \epsilon_\theta(x_{t-1}, c = ok) \|$$

$$d2 = \| \epsilon_\theta(x_{t-1}, c = ng1) - \epsilon_\theta(x_{t-1}, c = ng2) \|$$

$$d3 = \| \epsilon_\theta(x_{t-1}, c = ng1) - \epsilon_\theta(x_{t-1}, c = ng3) \|$$

$$\cdots$$

$$d = \max(d1, d2, d3, \dots )$$

Yet, in some embodiments, a weighted average of the maximum difference between each of OK and NG1 images, NG1 and NG2 images, and NG1 and NG3 images may be determined, and then the path corresponding to the weighted averages may be selected to push the OK and the NG1, NG2, and NG3 images. Furthermore, it should be noted that this technique may also be applied to cases where there are more or fewer classes and subclasses. Thus, a class may include for example, OK, NG1, NG2, NG3, NG4, and NG5 images. Yet in other embodiments, the class may include just OK, NG1, and NG2 images. Accordingly, many synthetic NG images may be generated by the target device so that an equal number of OK images and NG image are present to train an Al-classifier.

In some embodiments, a pre-trained classifier and/or a contrastive learning may be used to eliminate poor quality of fake NG images generated. For example, in some instances, the generated synthetic NG images are of poor quality such that a manual screening process may be utilized to eliminate such bad NG images. Yet, in other embodiments, the screening processing may be automated by using a pre-trained classifier trained on a corpus of real NG images to determine how it performs on the fake NG. If the classifier determines that a given fake NG has a low probability of being NG, then this image may be considered a poor-quality NG. On the other hand, if the classifier is "fooled" into believing (e.g., incorrectly determines) a given fake NG sample has a high probability of being NG, then the Diffusion model training may be considered to be sufficiently trained. Yet, in further embodiments, contrastive learning may be utilized where a neural network may be trained on a large corpus of real NG images. In such case, this neural network may be utilized to generate "features" or "embeddings" of real NG and fake NG images. If they are both similar, then there is a high confidence that the fake NG may be similar to a real NG as this neural network that is trained with contrastive learning is fooled. Accordingly, the quality of the fake NG samples may be evaluated.

In some embodiments, location-specific synthetic defects may be generated by using a mask during sampling to force the synthetic defects to appear in the desired regions, which are the unmasked portions. Therefore, synthetic NG images corresponding to different regions of the product (e.g., different areas of the circuitry) may be generated so that the Al-classifier may be trained in a manner that is desired. For example, if it is desired for the Al-classifier to identify defects only in certain portions of the product, then it may be more desirable to generate synthetic defect images corresponding to those particular portions of the product, whereas if it is desired for the Al-classifier to identify defects across all regions of the product, then it may be more desirable to generate synthetic defect images where the defects span across the all regions of the product.

FIG. 6 is a flow chart of a method for synthetic defect image generation using diffusion models, according to one or more embodiments of the present disclosure. Referring to FIG. 6, a first image may be obtained from the product (e.g., a target product), and a processor may apply noise to the first image to generate a first noisy image (step 602). The processor may be, for example, one or more of the processors of a computer system as will be described in more detail with reference to FIG. 7. In some embodiments, the first image may correspond to an OK image of the target product and by applying noise to the OK image, a noisy OK image may be generated. Next, at least a portion of the noise may begin to be removed by the processor from the first noise image based on a neural network (step 604). In other words, in order to get to the goal of generating a synthetic defect (NG) image, a class label of the neural network may be set to NG, and a denoising process may be performed on the first noisy image. In some embodiments, the denoising process may be performed by incrementally removing some amount of noise (e.g., at each step T as described above with reference to FIGS. 3-4). In some embodiments, during the denoising process, a denoising path on the neural network corresponding to a greatest difference between a first intermediate denoised image and a second intermediate denoised image may be selected (step 606). In other words, at certain selected or set increments during the denoising process, for example, at a certain specified or predetermined number of steps η (e.g., every 20 steps where η=20), a difference maximization may be performed by first setting the class label for the neural network to correspond to the first image (i.e., set class label to OK), and then generating the first intermediate denoised image. Next, the class label may be set to correspond to the second image (i.e., set class label to NG), and then generating the second intermediate denoised image. Once the first intermediate denoised image and the second intermediate denoised image are generated, a difference between the two images may be computed or determined. This process may be repeated for every possible denoising path. In other words, a first intermediate denoised image and a second intermediate denoised image may be generated for every path, and the difference between the two may be computed for each of the paths. Finally, the processor may select the path that resulted in the greatest difference between the first intermediate denoised image and the second intermediate denoised image. This process may be referred to herein the present disclosure as "pushing" the OK and NG images apart, thereby performing a difference maximization. The denoising process may be continued until all or substantially all of the noise is removed, and a second image is ultimately generated by the processor based on the denoising path selected as a consequence of the difference maximization (step 608). In some embodiments, the second image may be the synthetic NG image of the target product. Accordingly, a fake NG image may be generated from an OK image, and by performing difference maximization, the differences between the fake NG image and the OK image is increased (e.g., maximized) or emphasized so that the fake NG image and the OK image do not look alike so as to not be confused as being identical. Therefore, a plurality of NG images that are utilized by a defect classifier for the target product may be generated from the OK images.

In some embodiments, the techniques described above may be utilized during a manufacturing process of one or more products or devices to detect, identify, remove, and/or fix defective components, portions of components, and/or products. More particularly, the manufacturing facility may produce one or more electronic devices such as, for example, a display device, a smartphone, an OLED/QD-LED display, and the like, which may include corresponding circuitry (e.g., microchips with circuitry that are produced by semiconductor fabrication processes). During the production of such products, defects may be present in the circuitry that are so small that they may be indistinguishable by the naked human eye. For example, a short circuit or an open circuit may be present in the circuitry from the semiconductor fabrication process. Thus, inspection systems that use optics (e.g., cameras) and computers with AI/ML may be implemented to detect, identify, remove, and/or repair such defects.

In some embodiments, the AI/ML may include a diffusion model such as the ones described above that may be trained based on OK and NG images from another product that is substantially similar or related to the product that is being inspected. The trained model may then be utilized on the new product by taking OK images from the new product and generating fake NG images corresponding to the new product from the OK images of the new product based on the model that was trained from OK and NG images of the different product. Accordingly, an abundant amount of fake NG images corresponding to the new product may be generated. It is noted that OK images do not necessarily need to be generated because the new product is generally produced without or substantially without defects and therefore plenty of real OK images may be obtained from the new product. Therefore, the real OK images and the generated fake NG images may be utilized by the AI classifier on the new product during an inspection process to determine whether any defects exist, and if defects are detected, then identifying the type of defects, e.g., short circuit, open circuit, etc. In some embodiments, the classifier may determine that the identified defects may be repaired, or it may determine that the defect is not repairable, and the product or component may be discarded.

Furthermore, it should be noted that the embodiments of the present disclosure are not limited to the above-described examples, and that a person having ordinary skill in the art may implement these techniques in other applications where detection and identification are desired to ensure quality assurance of one or more products. Moreover, the diffusion model may be implemented not only to generate fake NG images from OK images but rather any image or physical attribute alteration from one class of images or physical attributes to another class of images or physical attributes that may be used for anomaly detection in time series data. For example, a manufacturing line that produces a machine such as a robot may include sensors that measure various physical attributes (e.g., torque, position, velocity, etc.) of the robot to ensure the attributes meet certain criteria or thresholds. As with the above-described electronic device example, an abundance of OK data (e.g., OK physical attributes) for a normally functioning robot may be available but lack NG data for the robot (i.e., physical attributes that would cause the robot to fail or nearly fail). Thus, the diffusion model may be used to generate fake NG data for early detection of potential robot failure, and therefore actual robot failure may be prevented or corrected before actually failing. Accordingly, the diffusion model of the present disclosure may be implemented for use in various anomaly or defect detection scenarios.

Figure 7:
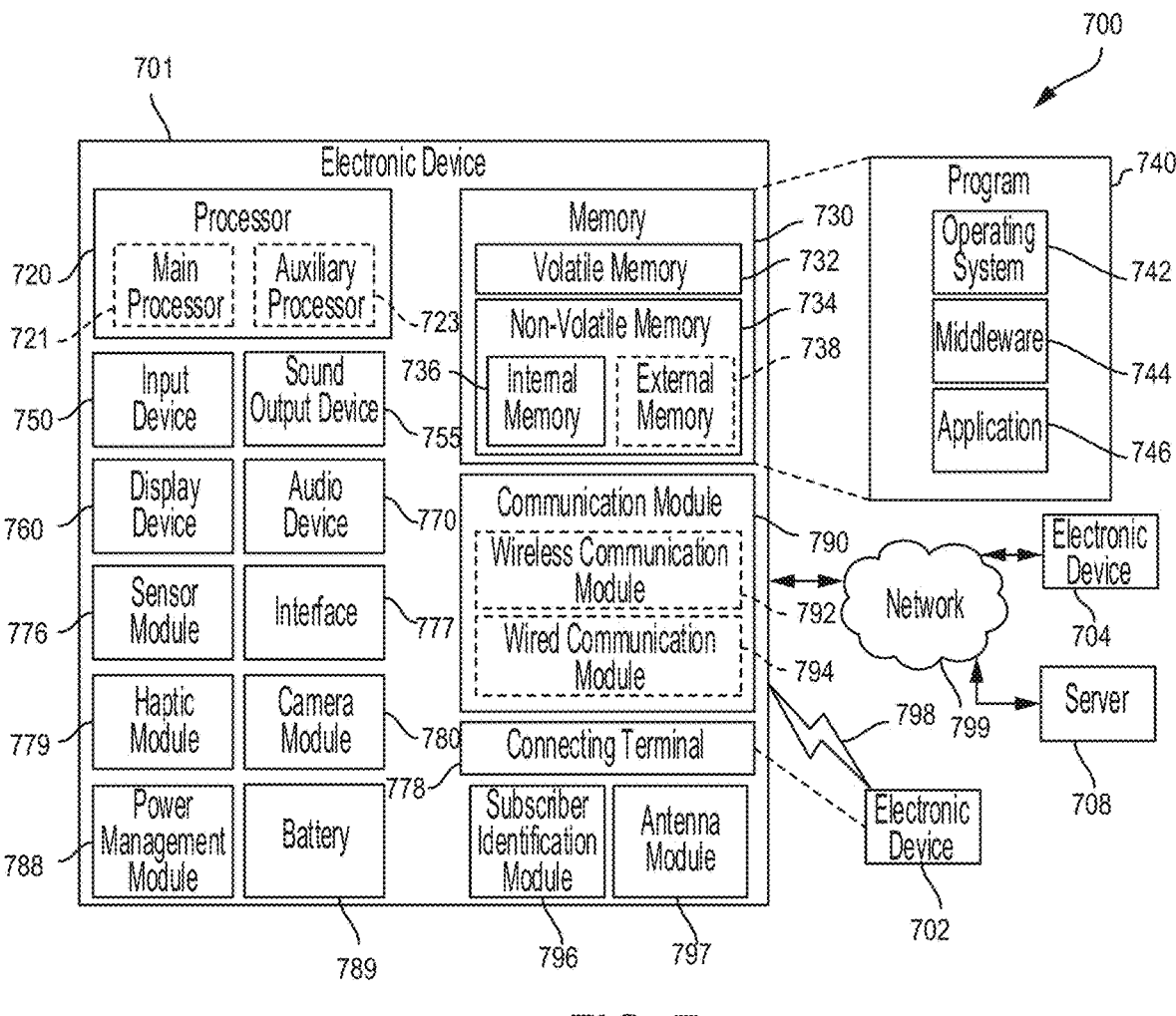
FIG. 7 is a block diagram of an electronic device in a network environment, according to an embodiment.

FIG. 7 is a block diagram of an electronic device in a network environment 700 that may be configured to include the AI-based classifier including a neural network, according to an embodiment.

Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) card 796, or an antenna module 797. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute software (e.g., a program 740) to control at least one other component (e.g., a hardware or a software component) of the electronic device 701 coupled with the processor 720 and may perform various data processing or computations.

As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734. Non-volatile memory 734 may include internal memory 736 and/or external memory 738.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750 or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high-definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes. The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as BLUETOOTH™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims and their equivalents.

What is claimed is:

1. A method comprising:
   applying, by a processor, noise to a first image to generate a first noisy image;
   removing, by the processor, at least a portion of the noise from the first noisy image based on a neural network;
   selecting, by the processor, during the removing of the noise, a denoising path on the neural network corresponding to a greatest difference between a first intermediate denoised image and a second intermediate denoised image; and
   generating, by the processor, a second image based on the selected denoising path.

2. The method of claim 1, wherein the selecting of the denoising path on the neural network corresponding to the greatest difference comprises:

generating the first intermediate denoised image by setting a class label for the neural network corresponding to the first image;

generating the second intermediate denoised image by setting the class label for the neural network corresponding to the second image; and determining the difference between the first intermediate denoised image and the second intermediate denoised image.

3. The method of claim 1, wherein the neural network is trained by a source product and the first image is from a target product.

4. The method of claim 1, wherein the neural network is a diffusion model neural network.

5. The method of claim 1, wherein the diffusion model comprises a fixed time step and the selecting of the denoising path is performed at an interval corresponding to the fixed time step.

6. The method of claim 5, wherein the time step is in a range of 10 to 100.

7. The method of claim 1, wherein the first image is a defect free image of a target product.

8. The method of claim 7, wherein the second image is a synthetic defect image of the target product.

9. The method of claim 1, wherein the noise comprises Gaussian noise.

10. The method of claim 1, wherein the removing of the noise from the first noisy image further comprises selecting a denoising path on the neural network corresponding to the greatest difference between the first intermediate denoised image and the second intermediate denoised image, and between the second intermediate denoised image and a third intermediate denoised image.

11. A system comprising:

a processor; and a memory storing instructions executed by the processor to cause the processor to:

apply noise to a first image to generate a first noisy image;

remove at least a portion of the noise from the first noisy image based on a neural network;

select, during the removing of the noise, a denoising path on the neural network corresponding to a greatest difference between a first intermediate denoised image and a second intermediate denoised image; and generate a second image based on the selected denoising path.

12. The system of claim 11, wherein the selecting of the denoising path on the neural network corresponding to the greatest difference comprises:

generating the first intermediate denoised image by setting a class label for the neural network corresponding to the first image;

generating the second intermediate denoised image by setting the class label for the neural network corresponding to the second image; and determining the difference between the first intermediate denoised image and the second intermediate denoised image.

13. The system of claim 11, wherein the neural network is trained by a source product and the first image is from a target product.

14. The system of claim 11, wherein the neural network is a diffusion model neural network.

15. The system of claim 14, wherein the diffusion model comprises a fixed time step and the selecting of the denoising path is performed at an interval corresponding to the fixed time step.

16. The system of claim 1, wherein the time step is in a range of 10 to 100.

17. The system of claim 11, wherein the first image is a defect free image of a target product.

18. The system of claim 17, wherein the second image is a synthetic defect image of the target product.

19. The system of claim 11, wherein the noise comprises Gaussian noise.

20. The system of claim 11, wherein the removing of the noise from the first noisy image further comprises selecting a denoising path on the neural network corresponding to the greatest difference between the first intermediate denoised image and the second intermediate denoised image, and between the second intermediate denoised image and a third intermediate denoised image.

\* \* \* \* \*